United States Patent
Sundararajan et al.

(10) Patent No.: US 10,825,359 B2
(45) Date of Patent: Nov. 3, 2020

(54) METHOD AND SYSTEM FOR ANTHROPOMORPHIC TESTING DEVICE

(71) Applicant: Ford Global Technologies, LLC, Dearborn, MI (US)

(72) Inventors: Srinivasan Sundararajan, Ann Arbor, MI (US); Parakrama Valentine Weerappuli, West Bloomfield, MI (US); Kevin Michael Pline, Plymouth, MI (US); Raed Essa El-Jawahri, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 681 days.

(21) Appl. No.: 15/467,187

(22) Filed: Mar. 23, 2017

(65) Prior Publication Data

US 2018/0277020 A1 Sep. 27, 2018

(51) Int. Cl.
*G09B 23/28* (2006.01)
*G01M 7/08* (2006.01)
*G01M 17/007* (2006.01)

(52) U.S. Cl.
CPC .............. *G09B 23/28* (2013.01); *G01M 7/08* (2013.01); *G01M 17/0078* (2013.01)

(58) Field of Classification Search
CPC combination set(s) only.
See application file for complete search history.

(56) References Cited

U.S. PATENT DOCUMENTS

| | | | |
|---|---|---|---|
| 5,528,943 | A | 6/1996 | Smrcka et al. |
| 7,047,831 | B2 | 5/2006 | Reynolds et al. |
| 7,353,151 | B2 | 4/2008 | Furusu et al. |
| 7,599,537 | B1 * | 10/2009 | Stefan ............ G06T 7/62 382/128 |
| 9,189,886 | B2 | 11/2015 | Black et al. |
| 9,195,794 | B2 | 11/2015 | Dariush |
| 2016/0078784 | A1 | 3/2016 | Sullenberger et al. |
| 2016/0368452 | A1 | 12/2016 | Le et al. |

FOREIGN PATENT DOCUMENTS

| | | |
|---|---|---|
| CN | 1877638 A | 6/2006 |
| CN | 101604348 A | 7/2009 |
| CN | 105719279 A | 6/2016 |

OTHER PUBLICATIONS

Hu et al., "Vehicle Crash Simulations with Morphed GHBMC Human Models of Different Stature, BMI, and Age", Jun. 2016, University of Michigan Transportation Research Institute, General Motors Holdings LLC (8 pages).
GB Search Report dated Sep. 21, 2018 re GB Appl. No. 1804456.0.

\* cited by examiner

*Primary Examiner* — Xin Y Zhong
(74) *Attorney, Agent, or Firm* — Frank A. MacKenzie; Bejin Bieneman PLC (57) ABSTRACT

A method includes receiving data including 3-dimensional scans of a plurality of torsos, dividing each scan into a plurality of cross-sections, calculating an area for each cross-section, and calculating a torso volume based on the calculated areas. The method may include fitting a curve defined by parameters to each cross-section. The area for each cross-section may be an area enclosed by the curve. The method may include receiving a desired torso volume percentile, and determining values for the parameters of the curves corresponding to the desired percentile.

16 Claims, 8 Drawing Sheets

METHOD AND SYSTEM FOR ANTHROPOMORPHIC TESTING DEVICE

BACKGROUND

Anthropomorphic testing devices, sometimes called "dummies," are used to simulate human occupants during tests of impacts to vehicles. Anthropomorphic testing devices are generally shaped like humans and include sensors to record the effects on the dummy of an impact to a vehicle carrying the dummy. Impact testing may also be performed as computer simulations involving computer-simulated anthropomorphic testing devices.

Anthropomorphic testing devices come in standard sizes. The sizes are based on a stature percentile of a target population, e.g., North American adults. Typical sizes include 50th percentile male, 5th percentile female, and 95th percentile male. The same standard sizes are used in computer simulations.

One drawback of this sizing scheme is that obese individuals are not as accurately modeled. Obesity is only weakly correlated with stature. Someone in the 95th percentile of weight could also be in the 95th percentile of stature. Full-body scans of obese individuals are available; however, it is a problem that using these scans in computer simulations of impacts is computationally unwieldy because of the large amount of data involved.

DETAILED DESCRIPTION

Disclosed herein is a solution to the problem of accurately modeling the effects of vehicle impacts on obese passengers in a computationally efficient manner. A model of an obese occupant of a vehicle is created that accurately reflects a target population. Equations are provided that describe cross-sectional shapes of a torso of the model. Advantageously, these equations allow for modeling that is less computationally demanding than, e.g., directly, i.e., entirely or substantially entirely, using a body scan of a typical individual of a particular obesity percentile.

A method includes receiving data including 3-dimensional scans of a plurality of torsos, dividing each scan into a plurality of cross-sections, calculating an area for each cross-section, and calculating a torso volume based on the calculated areas.

The method may include fitting a curve defined by parameters to each cross-section. The area for each cross-section may be an area enclosed by the curve. The method may include receiving a desired torso volume percentile, and determining values for the parameters of the curves corresponding to the desired percentile. The method may include generating a torso model based on the values of the parameters. The method may include applying the torso model to a full-body model of an anthropomorphic testing device. The full-body model may be generated independently of the values of the parameters. The method may include manufacturing a full-body anthropomorphic testing device having an anthropomorphic testing device (ATD) torso based on the torso model. The method may include manufacturing a jacket fittable to a full-body anthropomorphic testing device and having a varying thickness based on a geometric difference between the torso model and an ATD torso of the anthropomorphic testing device. Additionally, the curve for at least one cross-section for each torso may be an ellipse with one parameter for each semi-axis of the ellipse. Additionally, the curve for at least one cross-section for each torso may be a modified Bean equation:

$$r = \frac{\cos\theta(B*\cos^{A-2}\theta + \sin^{A-2}\theta)}{\cos^A\theta + \cos^{A/2}\theta\sin^{A/2}\theta + \sin^A\theta} * \frac{D}{B}$$

in which r and θ are polar coordinates and A, B, and D are parameters.

The method may include fitting a curve defined by parameters to each cross-section. The area for each cross-section may be an area enclosed by the curve. Each torso may include a thorax region, an abdomen region, and a pelvis region. The curve for each cross-section in the thorax region may be an ellipse with one parameter for each semi-axis of the ellipse. The curve for each cross-section in the pelvis region may be an ellipse with one parameter for each semi-axis of the ellipse. Additionally, the curve for each cross-section of the abdomen region may be a modified Bean equation:

$$r = \frac{\cos\theta(B*\cos^{A-2}\theta + \sin^{A-2}\theta)}{\cos^A\theta + \cos^{A/2}\theta\sin^{A/2}\theta + \sin^A\theta} * \frac{D}{B}$$

in which r and θ are polar coordinates and A, B, and D are parameters.

The plurality of torsos may include at least one thousand torsos.

A computer includes a processor and a memory. The processor is programmed to receive data including 3-dimensional scans of a plurality of torsos, divide each scan into a plurality of cross-sections, calculate an area for each cross-section, and calculate a torso volume based on the calculated areas.

The processor may be further programmed to fit a curve defined by parameters to each cross-section. The area for each cross-section may be an area enclosed by the curve. The processor may be further programmed to receive a desired torso volume percentile, and to determine values for the parameters of the curves corresponding to the desired percentile. The processor may be further programmed to generate a torso model based on the values of the parameters.

An anthropomorphic testing device may include a torso having a thorax region, an abdomen region, and a pelvis region. The thorax region and pelvis region may have a lateral cross-section described by an ellipse. The abdomen region may have a lateral cross-section described by a modified Bean equation:

$$r = \frac{\cos\theta(B*\cos^{A-2}\theta + \sin^{A-2}\theta)}{\cos^A\theta + \cos^{A/2}\theta\sin^{A/2}\theta + \sin^A\theta} * \frac{D}{B}$$

in which r and θ are polar coordinates and A, B, and D are parameters.

Figure 1:
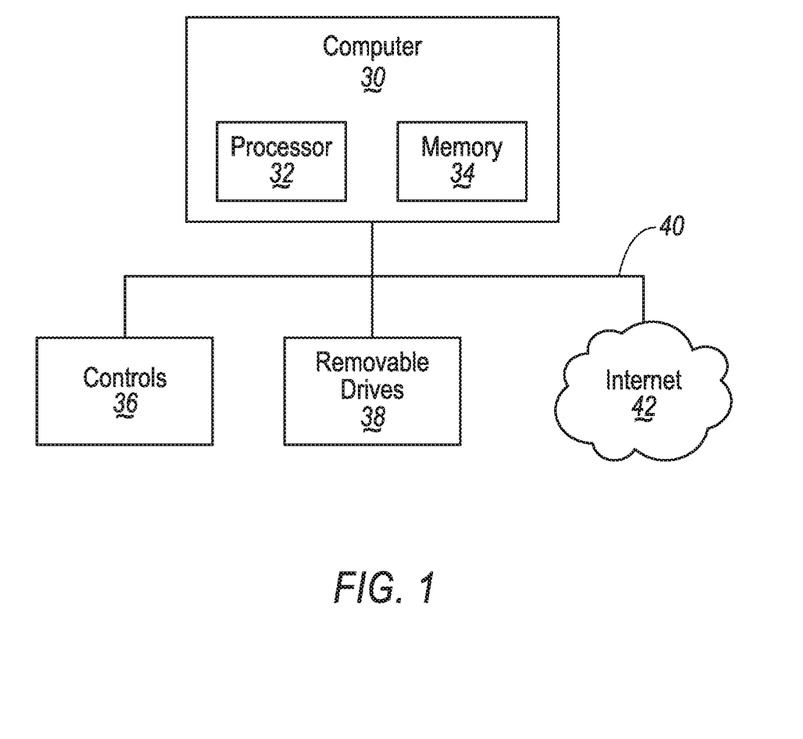
FIG. 1 is a block diagram of an exemplary computer system.

With reference to FIG. 1, a computer 30 includes a processor 32 and a memory 34. The memory 34 of the computer 30 may include memory for storing instructions executable by the processor 32 as well as for electronically storing data and/or databases. The computer 30 may receive input via controls 36 such as a keyboard and/or a mouse; via removable drives 38 such as USB drives; via a network connection 40 to, e.g., a wide area network (WAN) 42 typically including the Internet; or via any other means for transferring data to the computer 30. Although one computer 30 is shown in FIG. 1 for ease of illustration, it is to be understood that the computer 30 could include, and various operations described herein could be carried out by, one or more computing devices.

Figure 2:
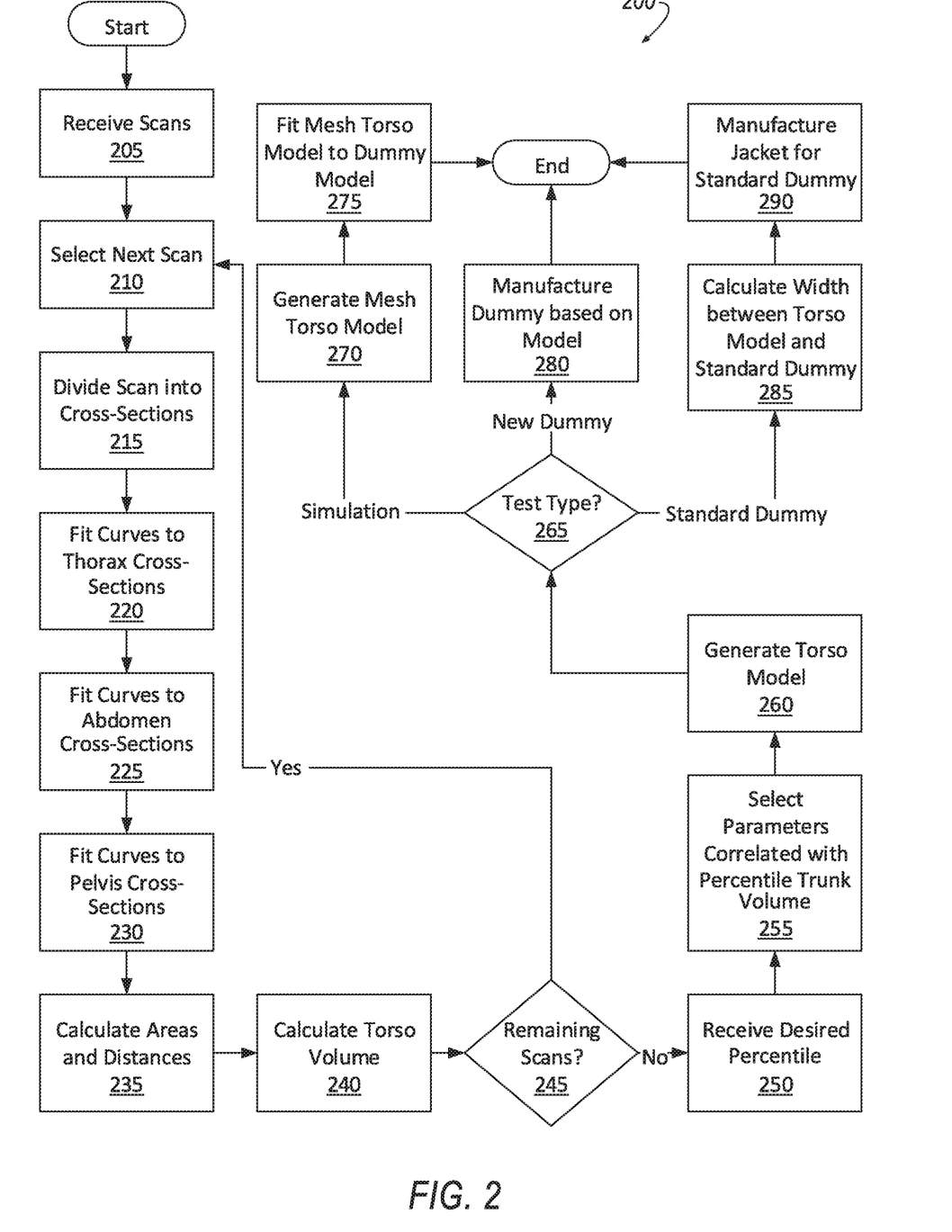
FIG. 2 is a process flow diagram illustrating an exemplary process for creating an anthropomorphic testing device or model thereof.

FIG. 2 is a process flow diagram illustrating an exemplary process 200 for creating an anthropomorphic testing device or model thereof. Other than blocks 280 and 290, the process 200 may be performed by the computer 30. The memory 34 may store instructions corresponding to steps of the process 200, and the processor 32 may be programmed to perform some or all of the steps of the process 200.

The process 200 begins in a block 205. In the block 205, the computer 30 receives data including 3-dimensional scans 50 of a plurality of torsos 52. The plurality of torsos 52 typically includes a quantity sufficient to provide a meaningful data set for operations described herein, e.g., may include one thousand or more torsos 52.

Figure 3A:
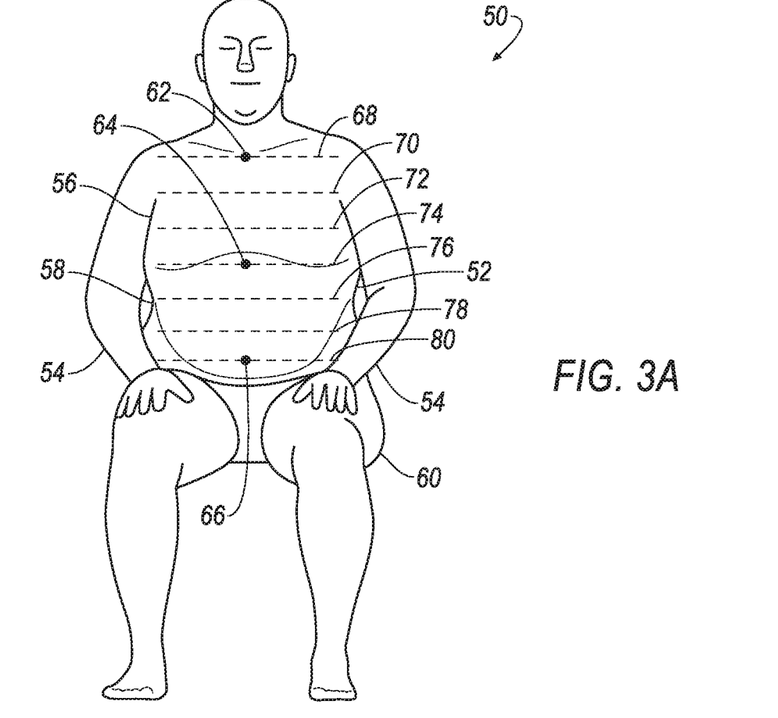
FIG. 3A is an example 3-dimensional scan of a person in a sitting pose.
Figure 3B:
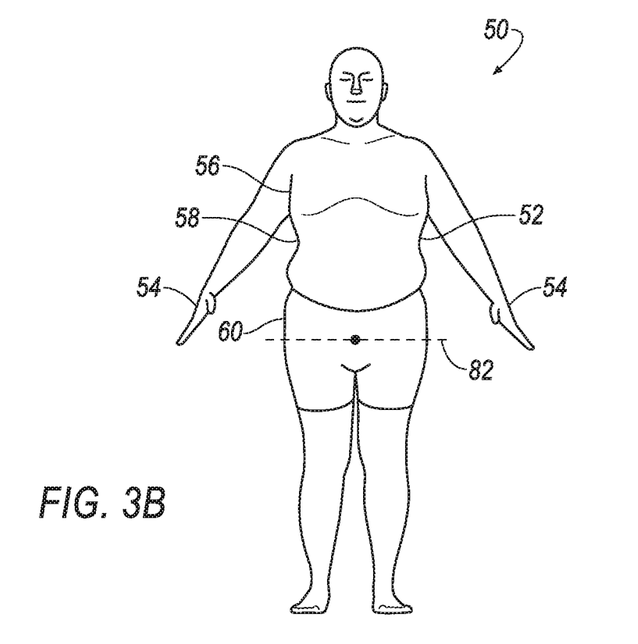
FIG. 3B is an example 3-dimensional scan of a person in a standing pose.
Figure 4A:
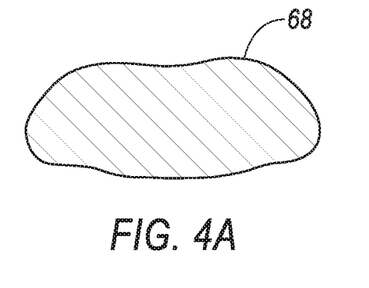
FIGS. 4A-H are example cross-sections of a torso of the 3-dimensional scan.
Figure 4B:
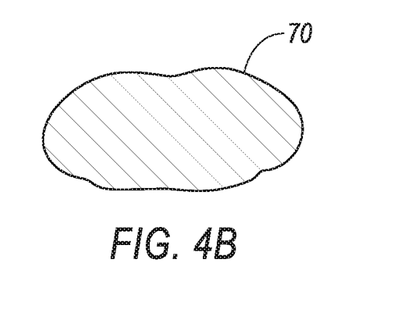
Figure 4C:
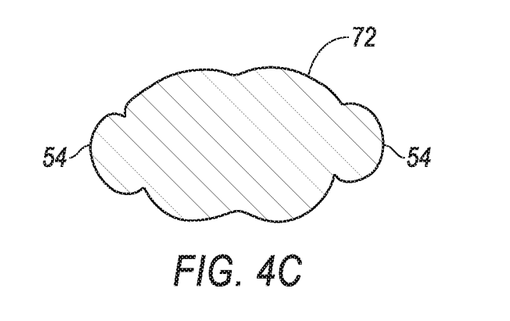
Figure 4D:
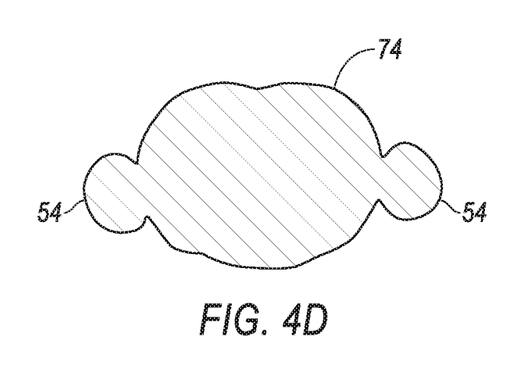
Figure 4E:
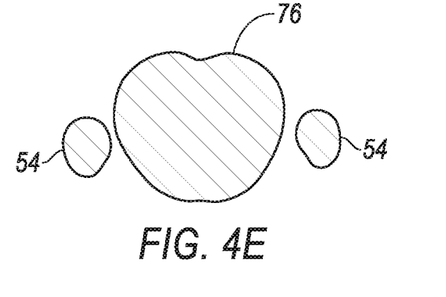
Figure 4F:
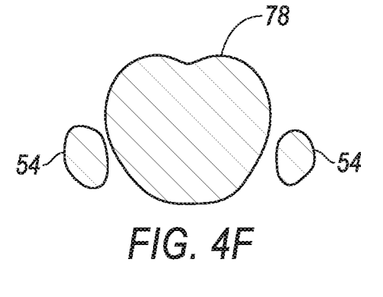
Figure 4G:
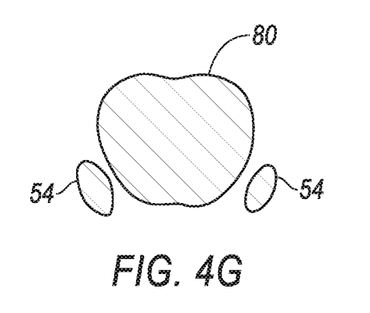
Figure 4H:
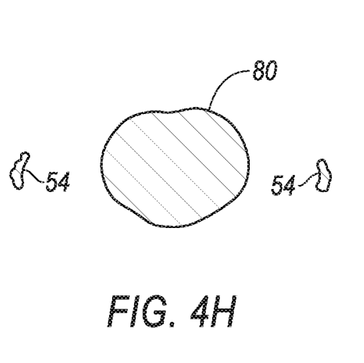

With reference to FIGS. 3A-B, the scans 50 may be of entire bodies, thereby including the torsos 52, or the scans 50 may be of only the torsos 52. For example, the Civilian American and European Surface Anthropometry Resource Project includes 3-dimensional full-body scans 50 of more than 2,400 North American subjects in three different poses: standing with arms 54 out, as shown in FIG. 3B; seated with arms 54 up (not shown); and seated with arms 54 down, as shown in FIG. 3A.

With continued reference to FIGS. 3A-B, each torso 52 may include a thorax region 56, an abdomen region 58, and a pelvis region 60. Each torso 52 may include other regions or may consist only of the thorax region 56, the abdomen region 58, and the pelvis region 60. The thorax region 56 is the part of the body between the neck and the abdomen, including the cavity enclosed by the ribs, breastbone, and dorsal vertebrae. The thorax contains the heart and lungs. The thorax region 56 may extend vertically from a suprastanale landmark 62 at a top of the breastbone where the clavicles meet to a substanale landmark 64 at a bottom of the breastbone. The abdomen region 58 is the part of the body between the thorax region 56 and the pelvis region 60, containing the digestive organs. The abdomen region 58 may extend vertically from the substanale landmark 64 to an iliocristale landmark 66 at a top of the ilium. The pelvis region 60 is the part of the body including the pelvis and the organs enclosed thereby. The pelvis region 60 may extend vertically from the iliocristale landmark 66 to a bottom of the pelvis.

Returning to FIG. 2, after the block 205, in a block 210, the computer 30 selects the next scan 50 from the plurality of scans 50. The scans 50 may be indexed by, e.g., an index number. The computer 30 may select the scan 50 corresponding to the index number following the index number of the previous scan 50 or, if no scans 50 have been processed, the scan 50 corresponding to the first of the index numbers.

Next, in a block 215, the computer 30 divides the selected scan 50 into a plurality of cross-sections 68, 70, 72, 74, 76, 78, 80, and 82. The cross-sections 68-82 may be parallel to each other and spaced vertically relative to the torsos 52 from each other. The cross-sections 68-82 may be all from the same pose of the scan 50 or may be from multiple poses of the same scan subject. The cross-sections 68-82 may be located relative to one or more of the landmarks 62, 64, 66 of the torso 52. The cross-sections 68-82 may be formed of, e.g., a plurality of points defined by two spatial coordinates. The cross-sections 68-82 may be subjected to additional processing to, e.g., remove the arms 54.

For example, with reference to FIGS. 3A-B and FIGS. 4A-H, a first cross-section 68 may be located at the suprastanale landmark 62; a second cross-section 70 may be located one third the length from the suprastanale landmark 62 to the substanale landmark 64; a third cross-section 72 may be located two thirds the length from the suprastanale landmark 62 to the substanale landmark 64; a fourth cross-section 74 may be located at the substanale landmark 64; a fifth cross-section 76 may be located one third the length from the substanale landmark 64 to the iliocristale landmark 66; a sixth cross-section 78 may be located two thirds the length from the substanale landmark 64 to the iliocristale landmark 66; a seventh cross-section 80 may be located at the iliocristale landmark 66, all of the preceding cross-sections from a sitting pose; and an eighth cross-section 82 may be located at a point of maximum pelvis width from a standing pose. (The adjectives "first," "second," "third," etc. are used throughout this document as identifiers and are not intended to signify importance or order.) The first, second, third, and fourth cross-sections 68, 70, 72, 74 are thorax cross-sections; the fifth, sixth, and seventh cross-sections 76, 78, 80 are abdomen cross-sections; and the eighth cross-section 82 is a pelvis cross-section.

Returning to FIG. 2, after the block 215, in a block 220, the computer 30 fits a curve defined by parameters to each thorax cross-section 68, 70, 72, 74. The computer 30 may use any suitable optimization function to find values for the parameters for which the curve has the best fit. For example, the optimization function may be a least-squares minimization.

Figure 5A:
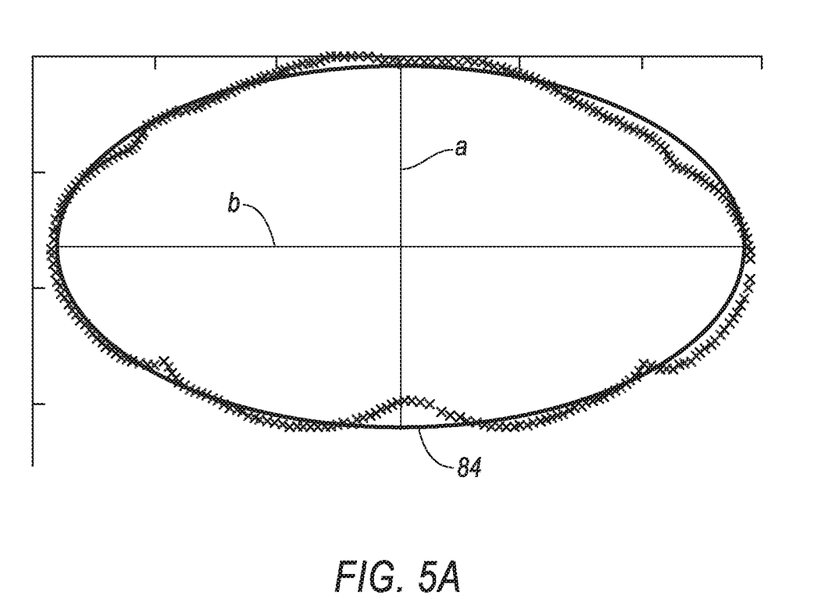
FIG. 5A is an example ellipse curve fitted to a cross-section.

With reference to FIG. 5A, for example, the curve for the thorax cross-section 68, 70, 72, 74 may be an ellipse 84:

$$\left(\frac{x}{a}\right)^2 + \left(\frac{y}{b}\right)^2 = 1$$

in which x and y are Cartesian coordinates and a and b are the parameters. The parameters may be the lengths of each semi-axis a, b of the ellipse 84, that is, half the length and half the width of the ellipse 84. For another example, the curve may be a superellipse:

$$\left|\frac{x}{a}\right|^n + \left|\frac{y}{b}\right|^n = 1$$

in which x and y are Cartesian coordinates and a, b, and n are the parameters. Specifically, the curve may be a hyperellipse, meaning n>2.

Returning to FIG. 2, after the block 220, in a block 225, the computer 30 fits a curve defined by parameters to each abdomen cross-section 76, 78, 80. The computer 30 may use any suitable optimization function to find values for the parameters for which the curve has the best fit. For example, the optimization function may be a least-squares minimization.

Figure 5B:
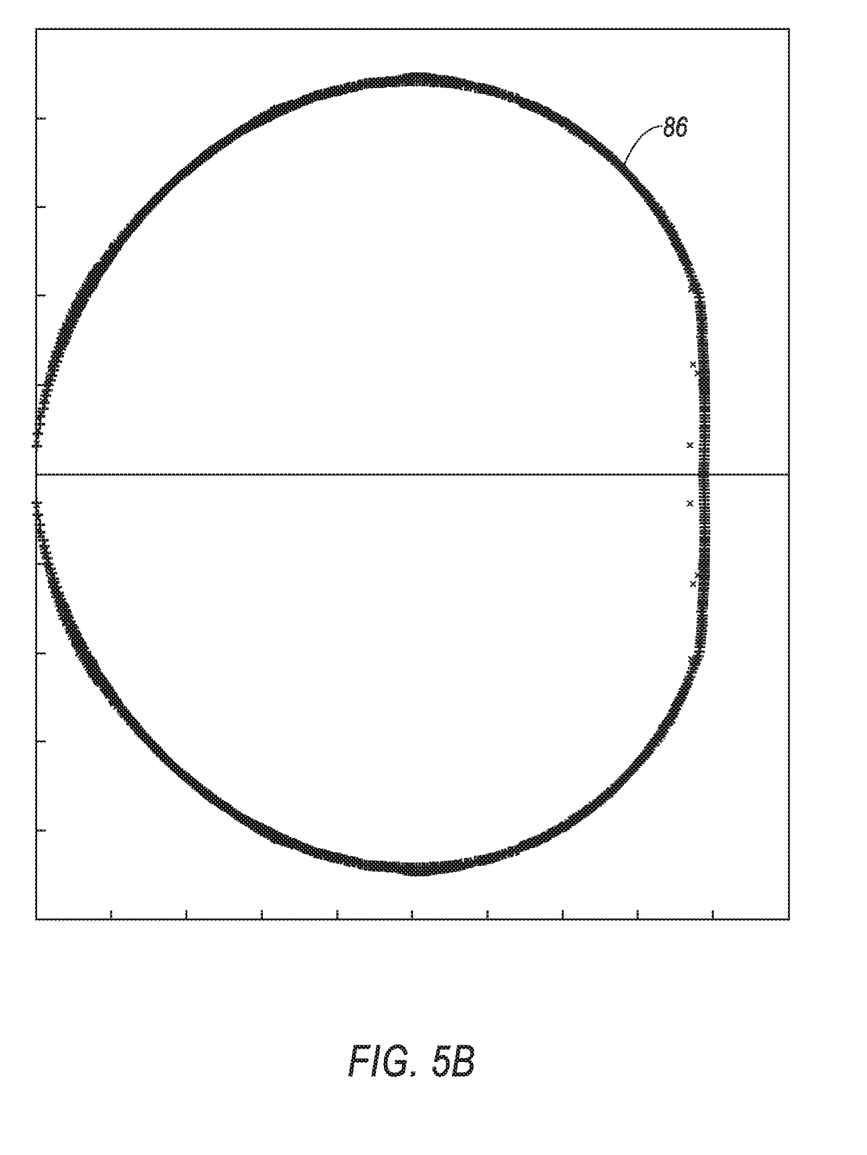
FIG. 5B is an example modified Bean curve fitted to a cross-section.

With reference to FIG. 5B, for example, the curve for the abdomen cross-section 76, 78, 80 may be a modified Bean equation 86:

$$r = \frac{\cos\theta(B*\cos^{A-2}\theta + \sin^{A-2}\theta)}{\cos^A\theta + \cos^{A/2}\theta * \sin^{A/2}\theta + \sin^A\theta} * \frac{D}{B}$$

in which r and θ are polar coordinates and A, B, and D are the parameters. The modified Bean equation 86 is a modification of the known equation for a so-called Bean curve, and has been found to provide a close fit for obese males.

Returning to FIG. 2, after the block 225, in a block 230, the computer 30 fits a curve defined by parameters to each pelvis cross-section 82. The computer 30 may use any suitable optimization function to find values for the parameters for which the curve has the best fit. For example, the optimization function may be a least-squares minimization. The curve may be an ellipse 84 or a hyperellipse, as described above.

Next, in a block 235, the computer 30 calculates an area for each cross-section and a distance between each pair of adjacent cross-sections. The area for each cross-section may be the area enclosed by the curve fit to that cross-section. The distances may be derived from the landmarks 62, 64, 66.

Next, in a block 240, the computer 30 calculates the torso volume based on the calculated areas and distances. For example, the computer 30 may sum the products of the area and the average of the distances to the adjacent cross-sections for each cross-section. For another example, the computer 30 may sum the products of the distance between adjacent cross-sections and the average area of the adjacent cross-sections for each distance between two adjacent cross-sections. For yet another example, for the thorax region 56 and the abdomen region 58, the computer 30 may sum the products of the distance between adjacent cross-sections and the average area of the adjacent cross-sections for each distance for each distance between two adjacent cross-sections, and for the pelvis region 60, the computer 30 may multiply the area of the eighth cross-section 82 and the distance from the seventh cross-section 80 to a seat:

$$V = \frac{A_1 + A_2}{2}*L_{1-2} + \frac{A_2 + A_3}{2}*L_{2-3} + \frac{A_3 + A_4}{2}*L_{3-4} +$$
$$\frac{A_4 + A_5}{2}*L_{4-5} + \frac{A_5 + A_6}{2}*L_{5-6} + \frac{A_6 + A_6}{2}*L_{6-7} + A_8 + L_{7-seat}$$

in which V is the torso volume; $A_1$ through $A_8$ are the areas of the first through eighth cross-sections 68-82, respectively; $L_{1-2}$ through $L_{6-7}$ are the distances between the first and second cross-sections 68, 70 through the sixth and seventh cross-sections 78, 80, respectively; and $L_{7-seat}$ is the distance between the seventh cross-section 80 and a seating surface for a scan 50 in the sitting pose.

Next, in a decision block 245, the computer 30 determines whether any scans 50 remain to process. For example, the computer 30 may determine whether the index number of the most recent scan 50 is the last index number. If any scans 50 do remain, the process 200 proceeds back to the block 210 to repeat the blocks 215-240 for the next scan 50.

If no more scans 50 remain, next, in a block 250, the computer 30 receives a desired torso volume percentile. The desired torso volume percentile may be directly selected by the user; may correlate with a criterion selected by the user, such as weight, and be retrieved form a lookup table or the like; or may be selected some other way. For example, if the user wants to test performance for obese occupants of a vehicle, the user may input 95th percentile weight, and the computer 30 may determine the torso volume percentile correlated with the 95th percentile weight.

Next, in a block 255, the computer 30 selects parameters of the curves corresponding to the desired percentile. For example, the computer 30 may select the parameters a, b for ellipses for each of the thorax cross-sections 68, 70, 72, 74 and pelvis cross-section 82, and the parameters A, B, D for the modified Bean equations 86 for each of the abdomen cross-sections 76, 78, 80, according to correlations between the each of the parameters and the desired torso volume percentile.

Next, in a block 260, the computer 30 generates a torso model based on the values of the parameters. The torso model is a 3-dimensional model of a typical male in the desired torso volume percentile. The computer 30 may generate curves and distances between curves for each cross-section, and then create a surface connecting the curves to each other.

Next, in a decision block 265, the computer 30 determines which type of performance testing will be performed. The computer 30 may determine the type of testing by receiving a user selection of the type of testing. Alternatively, the computer 30 may only be programmed to perform the steps for one type of testing. Types of performance testing include computer-simulated testing, testing with a new anthropomorphic testing device 92 (or "dummy"), and testing with a modified standard anthropomorphic testing device 94.

After the decision block 265, if the type of testing is computer-simulated testing, in a block 270, the computer 30 generates a mesh torso model. The computer 30 may use the torso model generated in the block 260 and divide the surface of the torso model into a mesh of, e.g., triangular shapes, e.g., such mesh modeling technique being according to that such as is known, e.g., in the field of finite element analysis.

Figure 6A:
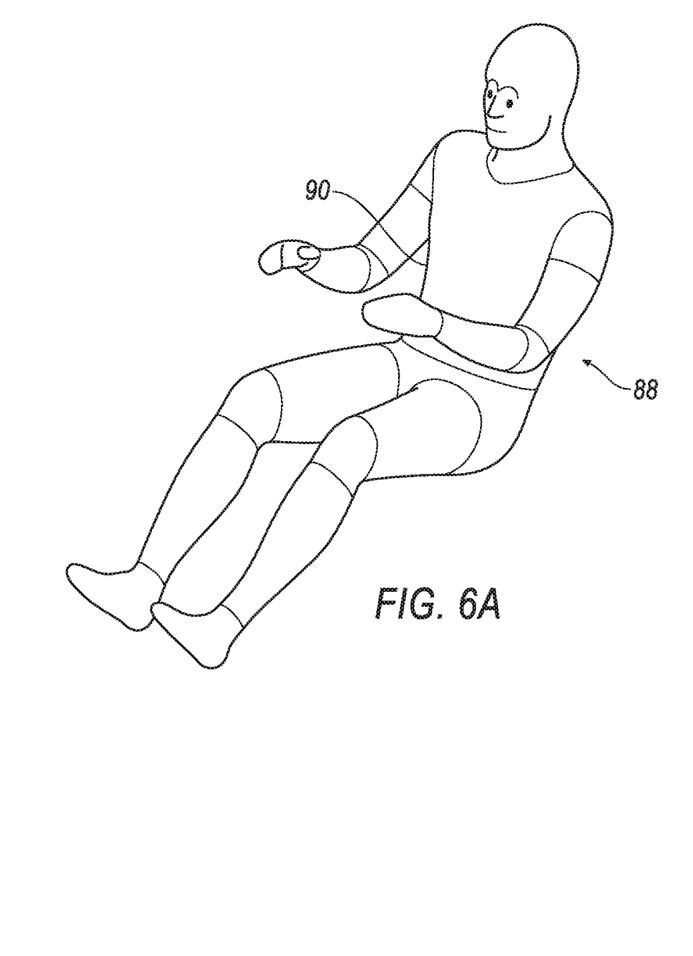
FIG. 6A is an example model of an anthropomorphic test device.
Figure 6B:
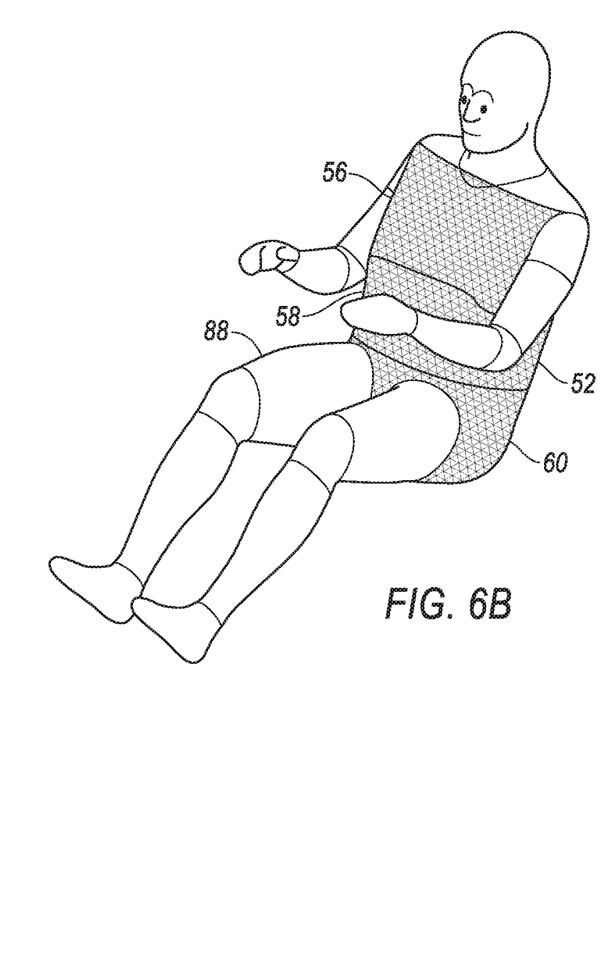
FIG. 6B is the model of the anthropomorphic test device of FIG. 6A with an example mesh torso applied.

Next, in a block 275, the computer 30 applies the mesh torso model to a full-body model 88 of an anthropomorphic testing device 94. The full-body model 88 may have been generated independently of the values of the parameters. For example, the full-body model 88 may be a model of a standard-sized 50th percentile-stature anthropomorphic testing device 94, as shown in FIG. 6A. The computer 30 may position the mesh torso model on the full-body model 88 using, e.g., the landmarks, as shown in FIG. 6B. Alternatively, the computer 30 may apply the torso model generated in the block 260 to the full-body model 88. After the block 275, the process 200 ends.

Figure 7:
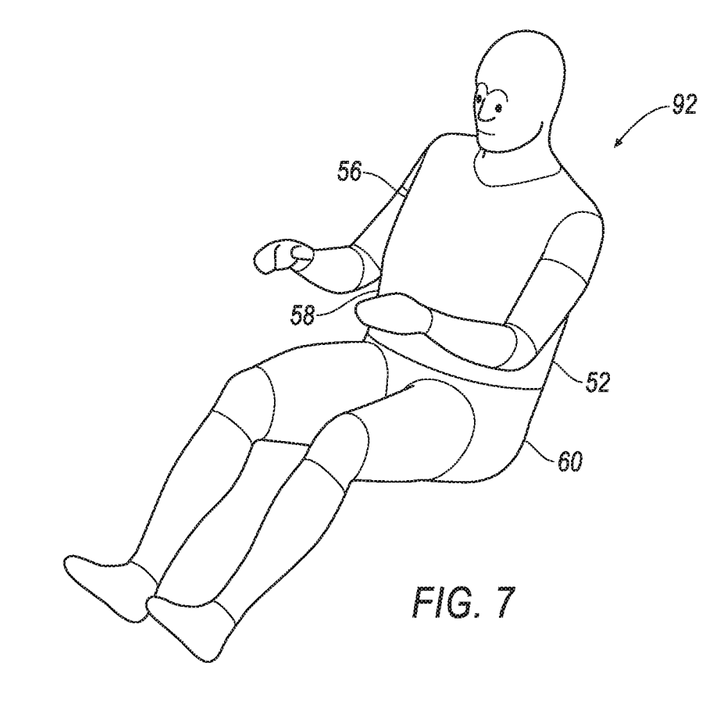
FIG. 7 is an anthropomorphic testing device.

After the decision block 265, if the type of testing is testing with a new anthropomorphic testing device 92, in a block 280, a full-body anthropomorphic testing device 92 having an ATD torso 90 based on the torso model is manufactured, as shown in FIG. 7. The anthropomorphic testing device 92 may have a 50th percentile stature. The anthropomorphic testing device 92 may include the ATD torso 90 having the thorax region 56, the abdomen region 58, and the pelvis region 60. The thorax region 56 and the pelvis region 60 may have a lateral cross-section described by an ellipse 84, and the abdomen region 58 may have a lateral cross-section described by a modified Bean equation 86:

$$r = \frac{\cos\theta(B*\cos^{A-2}\theta + \sin^{A-2}\theta)}{\cos^A\theta + \cos^{A/2}\theta*\sin^{A/2}\theta + \sin^A\theta} * \frac{D}{B}$$

in which r and θ are polar coordinates and A, B, and D are the parameters. After the block 280, the process 200 ends.

After the decision block 265, if the type of testing is testing with a modified standard anthropomorphic testing device 94, in a block 285, the computer 30 calculates a thickness between the torso model and an ATD torso 90 of a preexisting anthropomorphic testing device 94. The anthropomorphic testing device 94 may be, e.g., a standard-sized 50th percentile-stature anthropomorphic testing device. The computer 30 may determine a geometric difference between the torso model and the ATD torso 90 by positioning the torso model over a model of the ATD torso 90 and calculating a thickness between the models at a plurality of positions.

Figure 8:
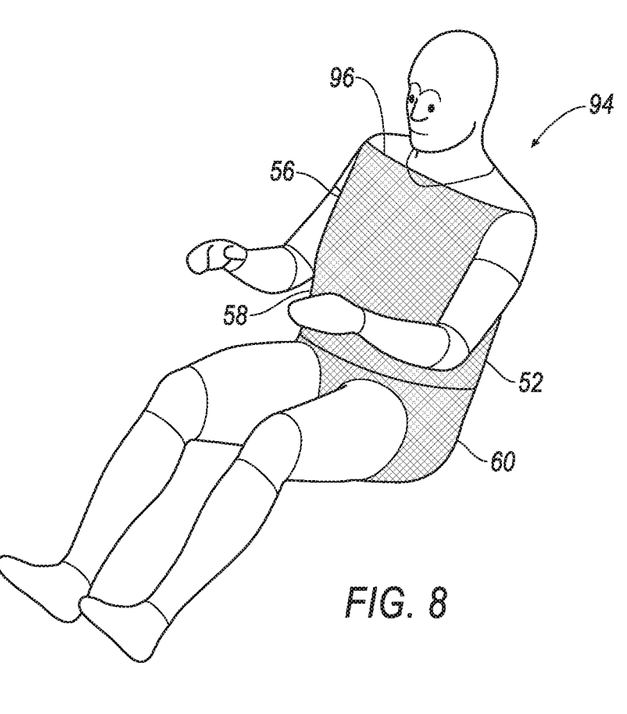
FIG. 8 is an anthropomorphic testing device having a jacket.

Next, in a block 290, a jacket 96 fittable to a full-body anthropomorphic testing device 94 is manufactured, as shown in FIG. 8. The jacket 96 may have a varying thickness based on the geometric difference determined in the block 285. The jacket 96 may be formed, e.g., as a single piece that can be wrapped around the ATD torso 90 of a preexisting anthropomorphic testing device 94, or as multiple pieces that may be individually placed on the ATD torso 90. With the jacket 96 on, the anthropomorphic testing device 94 may include the ATD torso 90 having the thorax region 56, the abdomen region 58, and the pelvis region 60. The thorax region 56 and the pelvis region 60 may have a lateral cross-section described by an ellipse 84, and the abdomen region 58 may have a lateral cross-section described by a modified Bean equation 86:

$$r = \frac{\cos\theta(B*\cos^{A-2}\theta + \sin^{A-2}\theta)}{\cos^A\theta + \cos^{A/2}\theta*\sin^{A/2}\theta + \sin^A\theta} * \frac{D}{B}$$

in which r and θ are polar coordinates and A, B, and D are parameters. After the block 290, the process 200 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method comprising:
    receiving data including 3-dimensional scans of a plurality of torsos;
    dividing each scan into a plurality of cross-sections;
    fitting a curve defined by parameters to each cross-section of each scan;
    calculating an area enclosed by the respective curve for each cross-section of each scan;
    calculating a torso volume for each scan based on the calculated areas;
    receiving a desired torso volume percentile; and
    determining values for parameters of the curves corresponding to the desired percentile based on the calculated torso volumes.

2. The method of claim 1, further comprising generating a torso model based on the values of the parameters.

3. The method of claim 2, further comprising applying the torso model to a full-body model of an anthropomorphic testing device.

4. The method of claim 3, wherein the full-body model was generated independently of the values of the parameters.

5. The method of claim 2, further comprising manufacturing a full-body anthropomorphic testing device having an ATD torso based on the torso model.

6. The method of claim 2, further comprising manufacturing a jacket fittable to a full-body anthropomorphic testing device and having a varying thickness based on a geometric difference between the torso model and an ATD torso of the anthropomorphic testing device.

7. The method of claim 6, wherein the curve for at least one cross-section for each torso is an ellipse with one parameter for each semi-axis of the ellipse.

8. The method of claim 7, wherein the curve for at least one cross-section for each torso is a modified Bean equation:

$$r = \frac{\cos\theta(B*\cos^{A-2}\theta + \sin^{A-2}\theta)}{\cos^A\theta + \cos^{A/2}\theta * \sin^{A/2}\theta + \sin^A\theta} * \frac{D}{B}$$

in which r and θ are polar coordinates and A, B, and D are parameters.

9. The method of claim 1, wherein each torso includes a thorax region, an abdomen region, and a pelvis region.

10. The method of claim 9, wherein the curve for each cross-section in the thorax region is an ellipse with one parameter for each semi-axis of the ellipse.

11. The method of claim 10, wherein the curve for each cross-section in the pelvis region is an ellipse with one parameter for each semi-axis of the ellipse.

12. The method of claim 11, wherein the curve for each cross-section of the abdomen region is a modified Bean equation:

$$r = \frac{\cos\theta(B*\cos^{A-2}\theta + \sin^{A-2}\theta)}{\cos^A\theta + \cos^{A/2}\theta \sin^{A/2}\theta + \sin^A\theta} * \frac{D}{B}$$

in which r and θ are polar coordinates and A, B, and D are parameters.

13. The method of claim 1, wherein the plurality of torsos includes at least one thousand torsos.

14. A computer comprising a processor and a memory, the processor programmed to:
    receive data including 3-dimensional scans of a plurality of torsos;
    divide each scan into a plurality of cross-sections;
    fit a curve defined by parameters to each cross-section of each scan;
    calculate an area enclosed by the respective curve for each cross-section of each scan;
    calculate a torso volume for each scan based on the calculated areas;
    receive a desired torso volume percentile; and
    determine values for parameters of the curves corresponding to the desired percentile based on the calculated torso volumes.

15. The computer of claim 14, wherein the processor is further programmed to generate a torso model based on the values of the parameters.

16. A method comprising:
receiving data including 3-dimensional scans of a plurality of torsos;
dividing each scan into a plurality of cross-sections;
fitting a curve defined by parameters to each cross-section;
calculating an area enclosed by the respective curve for each cross-section; and
calculating a torso volume based on the calculated areas;
wherein each torso includes a thorax region, an abdomen region, and a pelvis region;
the curve for each cross-section in the thorax region is an ellipse with one parameter for each semi-axis of the ellipse;
the curve for each cross-section in the pelvis region is an ellipse with one parameter for each semi-axis of the ellipse; and
the curve for each cross-section of the abdomen region is a modified Bean equation:

$$r = \frac{\cos\theta(B*\cos^{A-2}\theta + \sin^{A-2}\theta)}{\cos^A\theta + \cos^{A/2}\theta * \sin^{A/2}\theta + \sin^A\theta} * \frac{D}{B}$$

in which r and θ are polar coordinates and A, B, and D are parameters.

* * * * *